United States Patent
Dickensheets

(10) Patent No.: US 7,133,984 B1
(45) Date of Patent: Nov. 7, 2006

(54) METHOD AND SYSTEM FOR MIGRATING DATA

(75) Inventor: Ray Edward Dickensheets, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 223 days.

(21) Appl. No.: 10/411,761

(22) Filed: Apr. 11, 2003

(51) Int. Cl.
*G06F 12/02* (2006.01)
*G06F 12/00* (2006.01)
*G06F 11/08* (2006.01)
*G06F 15/16* (2006.01)

(52) U.S. Cl. .................. 711/162; 711/114; 711/161; 711/165; 714/5; 707/204; 709/218; 709/219

(58) Field of Classification Search ................ 711/165, 711/114; 714/5; 707/204; 710/20, 21, 65, 710/74; 709/203, 218, 219, 232
See application file for complete search history.

(56) References Cited

U.S. PATENT DOCUMENTS

| 5,617,537 | A  | * | 4/1997  | Yamada et al. ............. 709/214 |
| 6,317,815 | B1 | * | 11/2001 | Mayer et al. ............... 711/165 |
| 6,446,090 | B1 | * | 9/2002  | Hart ........................... 707/201 |
| 6,453,413 | B1 | * | 9/2002  | Chen et al. .................... 713/2 |
| 6,484,269 | B1 | * | 11/2002 | Kopylovitz .................... 714/5 |
| 6,785,791 | B1 | * | 8/2004  | Watanabe et al. ........... 711/165 |
| 6,795,835 | B1 | * | 9/2004  | Ricart et al. ................ 707/204 |
| 2002/0010874 | A1 | * | 1/2002 | Barthel ......................... 714/4 |
| 2003/0182328 | A1 | * | 9/2003 | Paquette et al. ............ 707/204 |

* cited by examiner

*Primary Examiner*—Mano Padmanabhan
*Assistant Examiner*—Mardochee Chery

(57) ABSTRACT

A method, system, and medium for replicating data stored on a storage array is provided. Source data, which may change during the copy process, is copied to a target device. The source data is checked to determine whether any changes were made to the data. If so, the respective data bin is copied to the target component.

22 Claims, 5 Drawing Sheets

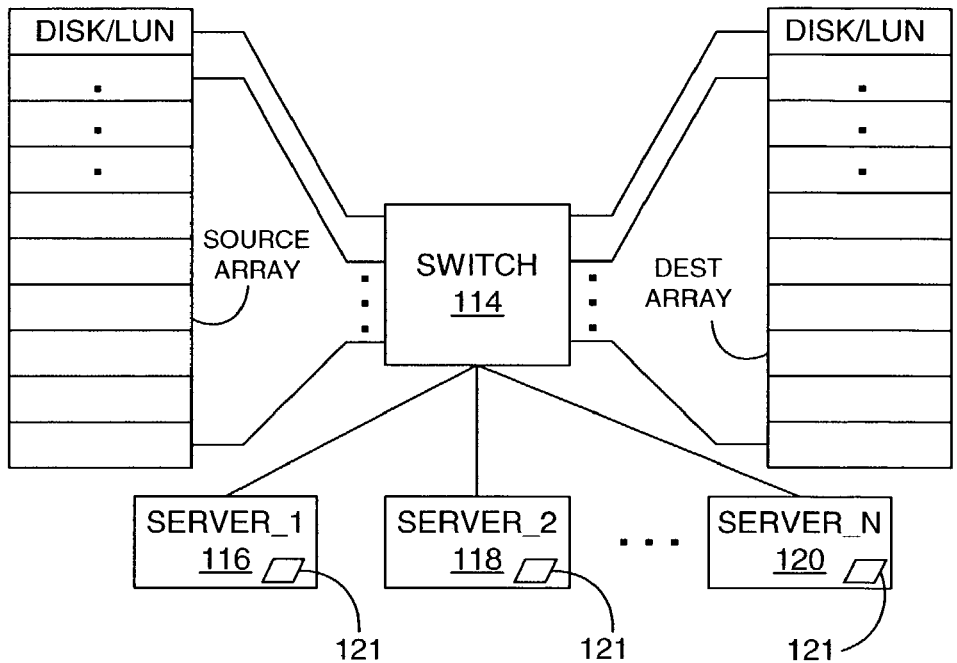
*FIG. 1A. - Prior Art*
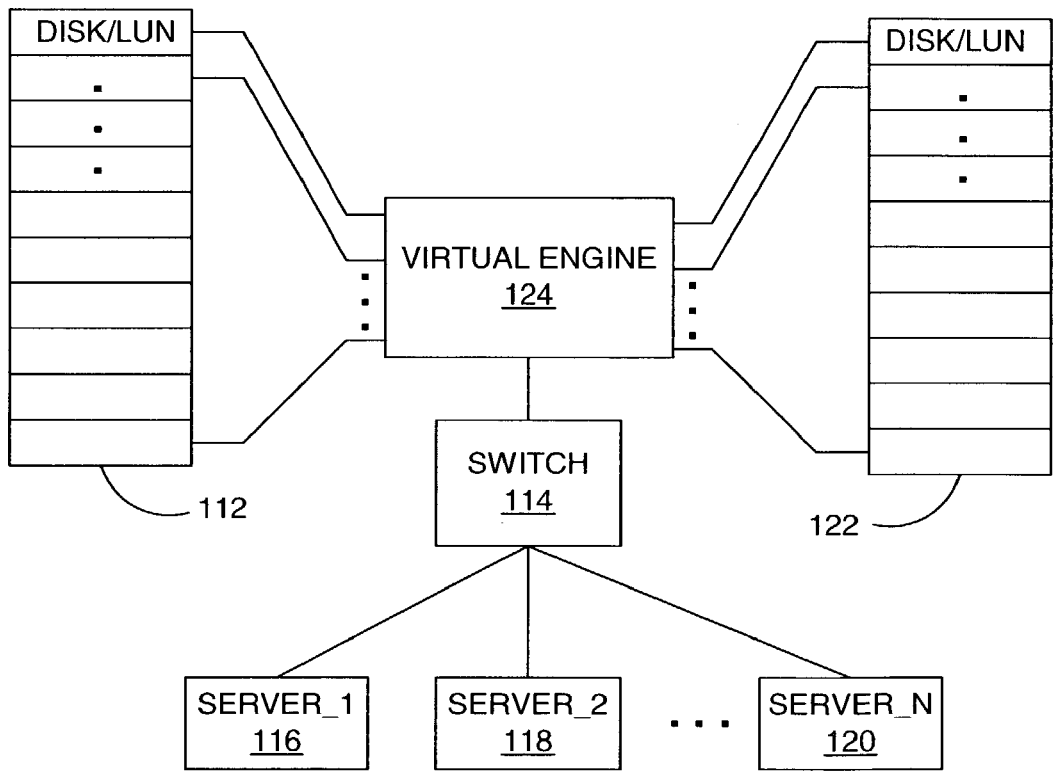
*FIG. 1B. - Prior Art*

METHOD AND SYSTEM FOR MIGRATING DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming. More particularly, the present invention provides a new and useful method to migrate data from a source to a destination in a computer-networking environment.

BACKGROUND OF THE INVENTION

Storage arrays are used in various computer-networking applications to store data accessed by servers and other devices. Over time, these storage arrays can become full or technologically obsolete. When the storage array reaches its maximum capacity, or for a variety of other reasons, the data stored in the initial data-storage array is desired to be migrated onto a target storage array.

Typical storage arrays include network-storage devices, RAID-type storage devices, or other types of storage media as is known in the art. Historically, replicating data from a first source to a target source has been problematic and expensive. One prior-art solution includes attempting to copy all of the files at the file level from the source device to the target device. However, this process typically requires an initial and enduring shut down of any applications that may affect any data-stored on the data-storage devices. Such a solution is impractical because the applications that need to be shut down are often relied upon for productivity.

Another prior-art solution includes placing a host agent, or some other copying application, on each server that has data to be copied. FIG. 1A illustrates such a topology. A source storage array is coupled to a destination array by a network switch 114, which is coupled to multiple servers 116, 188, and 120. This copying application 121 can attempt to mirror the various data components to copy only after it is recognized by the respective server, which requires rebooting the server. Each time one of the servers has to be rebooted, the applications running on that server are unavailable. By relegating the copying process to an application 121 that runs on the same server as needed applications, the server's performance is impeded. Moreover, each server (PC, node, etc.) must be equipped with the copying application 121. This can translate to installing the copying application 121 on tens or hundreds of machines, rebooting them, and running them with diminished performance. When the copying application 121 is removed, each server must be rebooted again. This method requires much human interaction; is time intensive; requires multiple reboots.

In still another potential prior-art solution, an appliance is inserted between the source and destination storage arrays. Data is written through this device. But this scheme is also time and resource intensive in that all of the applications that can affect the data being copied must be brought down to insert the appliance. Moreover, after the data is copied from the source destination to the target destination, manual intervention must take place to remove the physical appliance from between the two storage arrays. The servers that store data in the storage array must then be reconfigured to point to the target storage array rather than the original source storage array.

As the amount of data storage increases, surpassing the order of terabytes, the number of applications that make use of the data increases. Thus, terminating all applications that can affect any data stored on the source data-storage device becomes problematic. Accordingly, there is a need for a new and useful method of copying data from a first storage device to a second storage device that reduces the time necessary to shut down applications that may modify the data during the entirety of the copying process. Although the data-modification applications may need to be temporarily shut down, there is a need to minimize the time associated with shutting down all of the different applications that could potentially affect the data to be migrated.

SUMMARY OF THE INVENTION

The present invention solves at least the above problems by providing a system and method for copying data without having to shut down applications that may affect the data during the entirety of the copying process. In one aspect of the invention, a system is provided that includes a computer-program product. The computer-program product includes instructions for monitoring the copying process and identifying data units that contain data modified during the copying process. The invention can first copy all data that is stored on the source data-storage device and then make a second pass to copy only the data that has been changed during the copying process. The various software applications running on various servers that might affect the data being copied need only be shut down during the subsequent pass. This secondary pass typically requires a disproportionately smaller amount of time to copy the data from a first device to a second device than the entirety of the copying process. This difference is accentuated as bandwidth is restricted between the various severs and their corresponding remote storage device. If a server is connected to a remote storage device across a network, transferring massive amounts of data can consume considerable time.

The present invention has several practical applications in the technical arts; not limited to enabling an administrator to migrate vast amounts of data from a first storage array to a second storage array, while minimizing the downtime of software applications that may affect that data. The longer the software applications have to be shut down the less productive users are. For instance, when word-processing applications or CAD applications cannot be run, output is diminished. Data can be copied at a physical layer, thereby ensuring exact data replication as well as precluding the necessity of having to match source file structures with target file structures.

BRIEF DESCRIPTION OF THE SEVERAL VIEWS OF THE DRAWINGS

The present invention is described in detail below with reference to the attached drawing figures, wherein:

FIG. 1A is a block diagram of an attempted prior-art scheme illustrating that a separate copying application must be placed on each server;

FIG. 1B is a block diagram representing a prior-art solution with a virtual engine between a source storage array and a target storage array;

DETAILED DESCRIPTION OF THE INVENTION

Figure 2:
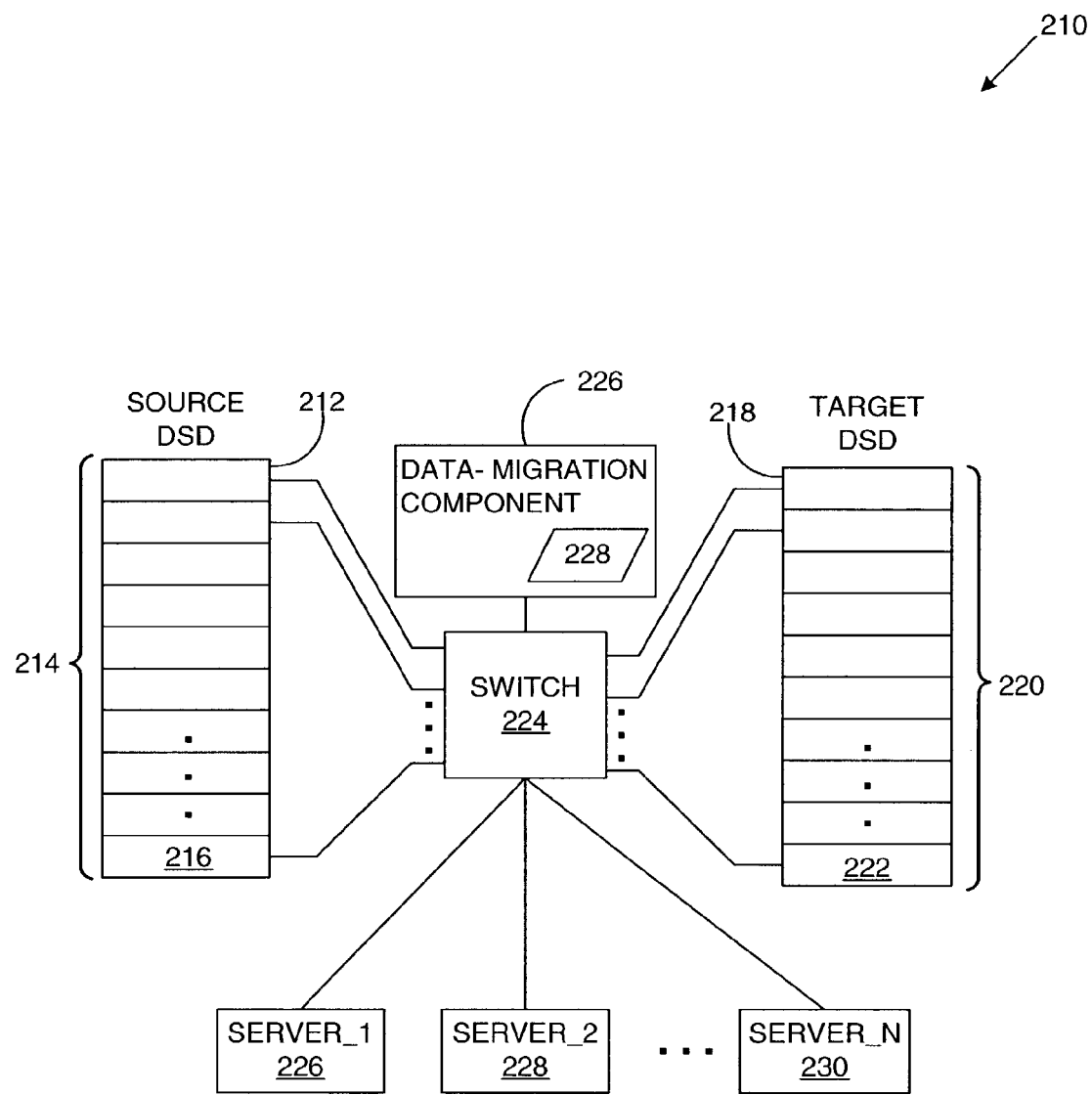
FIG. 2 is a block diagram depicting an exemplary, suitable operating environment for practicing the present invention.

The present invention provides at least a new and useful method and system for migrating data from a first storage device to a second storage device in a computer-networking environment. The method of the present invention drastically reduces the time required for applications to be shut down that could possibly affect the data to be transitioned.

Acronyms and Shorthand Notations

Throughout the disclosure of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

DIV Data-Integrity Value
DSD Data Storage Device
LUN Logical Unit Number
PC Personal Computer
RAID Redundant Array of Inexpensive (or Independent) Disks Further, various telecom technical terms are used throughout this disclosure. A definition of such terms can be found in *Newton's Telecom Dictionary* by H. Newton, 18th Updated and Expanded Edition (2002). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Data Migration

As previously mentioned, the present invention is, among other things, a computer-program product that includes an application to migrated data from a first device to a second device. Although "server" is used herein for simplicity's sake, those skilled in the art will readily appreciate that a variety of processing components can be connected to a computer-networking switch (switch). Conventional processing components are not limited to PCs, routers, other switches, nodes, terminal devices, handheld devices etc. Multiple servers can be connected to a storage array by a switch.

FIG. 1B depicts a prior-art solution with a source storage array 112 coupled to a destination storage array 122 via virtual engine 124. Prior to copying any data, each of the servers (116, 118, 120) are directed to read and write data to virtual engine 124. Virtual engine 124 then receives or writes data to the source storage device 112. This potential prior-art solution requires configuration at each of the servers. The servers are configured to read and write data to virtual engine 124. Each of the servers connected to switch 114 are running software applications. Some of these software applications may affect data stored in source data-storage device (DSD) 112. In this prior-art solution, the applications running on each of the servers (116, 118, and 120) must be shut down for the entirety of the copying process. When large quantities of data must be copied, terabytes and beyond, the copying process may last several hours or even days. Thus, the prior-art solution depicted in FIG. 1B would require the applications running on the remote servers to be shut down days, weeks, or even longer.

FIG. 2 represents an exemplary operating embodiment for practicing the present invention referenced generally by the numeral 210. Exemplary operating environment 210 includes a source DSD 212, which includes a plurality of storage devices 214. Exemplary storage devices could include a disk/LUN 216. A LUN, or a logical unit number, can refer to a logical storage component. For example a single hard disk may be partitioned into multiple logical drives. Each logical drive would be assigned an identifier, which in this example could be a LUN.

Source DSD 212 is coupled to a target DSD 218 by way of a switch 224. Switch 224 is conventional in nature, allowing multiple servers such as servers 230, 232, and 234 to use a common storage array such as source DSD 212. Target DSD 218 also includes a group of data components 220, which can be similar to the set of storage components 214 on source DSD 212. A data-migration component 226, which includes an application 228 for facilitating data copy, is coupled to switch 224. Because data-migration component 226 is coupled to switch 224, data-migration component 226 is exposed to the data on both source DSD 212 and target DSD 218.

Generally, the present invention copies data stored on source DSD 212 to target DSD 218 while the applications running on server 230, 232 and 234 are running. After an initial copy sequence, the applications on the servers are shut down and a final data replication process is conducted, whereby only the changed data units from source DSD 212 are copied to target DSD 218. This process, however, can be accomplished in a variety of ways. Those skilled in the relevant art will appreciate a variety of embodiments that do not depart from the spirit and scope of the present invention. A first exemplary embodiment is illustrated in FIG. 3.

Figure 3:
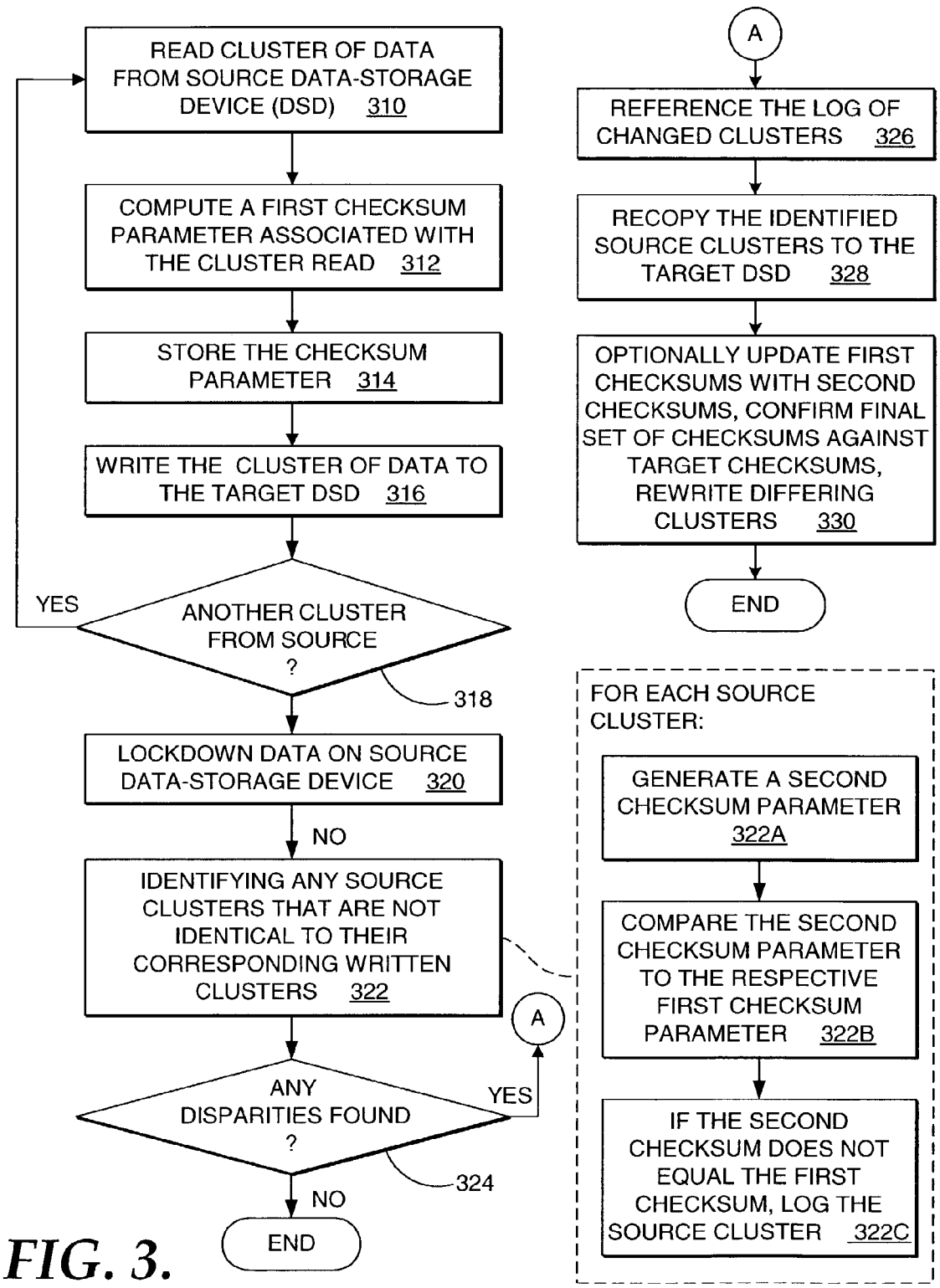
FIG. 3 represents an exemplary process flow carried out by the present invention.

Turning now to FIG. 3, an exemplary embodiment illustrating the functionality carried out by the present invention is shown. In an exemplary embodiment application 228, running on data-migration component 226, carries out the process of FIG. 3. Data-migration component 226 can be a conventional personal computer, server, or network of computing devices. At a step 310 a cluster of data is read from source DSD 212. A cluster is an exemplary data bin for storing data. Alternative data bins include sectors of prescribed sizes of data. A disk cluster is but one example of a suitable data bin. As used herein, the term "data bin" refers to a portion of storage media within which data is stored. Data is typically stored in clusters on hard disks. Data embodied on alternative computer-storage media listed above can also be copied using the present invention.

At a step 312, application 228 computes a first check parameter associated with a cluster of data read. A checksum value is one exemplary data-integrity value (DIV). A DIV is a value that is associated with each data bin, in this case cluster, of data. If optical storage media were being copied from, the corresponding data bins would be accessed. A data-integrity value is a value that is used to insure the integrity of data copied from source DSD 212 to target DSD 218. In a preferred embodiment the DIV is computed using a cyclical-redundancy-check (CRC) algorithm.

A CRC algorithm is a conventional technique used to obtain data reliability. Those skilled in the relevant art will be familiar with computing, deriving, extracting and storing CRC values. Typically the CRC technique is used in conjunction with blocks of data. As previously mentioned, clusters can be blocks of data. Typically, a CRC program calculates a CRC value, or checksum, for the data blocks specified, which in this case could be disk clusters. The CRC program performs a calculation on portions of the file, generating a unique number for the portion of data in question. If the file or portion of data is changed at all, even a single byte, the CRC value for that portion of data would also change. Accordingly the CRC values for identical files should be identical. Those skilled in the art will recognize the many flavors of CRC checking and their equivalents, all of which are contemplated within the scope of the present invention.

At a step 314, the checksum parameter associated with the cluster just read from source DSD 212 is stored. That cluster of data is written to target DSD 218 at a step 316. This process continues until all source clusters of source DSD 212 have been read and written to target DSD 218. At a step 318, a check is performed to determine whether there are any additional clusters to be read from source DSD 212. If not, processing continues to step 320 where the data on source DSD is locked down.

One method of locking down data, or preventing changes to that data, includes shutting down any application that may change the data stored in source DSD 112. With the data on source DSD 212 locked down, application 228 identifies any source clusters that are not identical to their corresponding written clusters at a step 322. Those skilled in the art will appreciate that this identification step can be carried out in a variety of ways. In one embodiment, a second checksum parameter can be computed for each cluster of the locked down source DSD 212. Each of the second checksum parameters can be compared to the checksum parameter stored in step 314 to determine whether a disparity exists at a step 322B. At a step 322C, if the second checksum does not equal the first checksum, then a log of the respective source cluster can be created. In an alternative embodiment, that source cluster could be immediately copied. Alternatively, a log could be created that includes the source clusters that have changed.

At a step 324, a determination is made as to whether any disparities exist between any of the clusters from the original source DSD 212 and the clusters subsequent to its lockdown. If there are disparities, then application 228 references at a step 326 a log of changed clusters created in step 322C. Application 228 then recopies the identified source clusters to the target DSD 218 at a step 328. Copying at the cluster level does not require application 228 to actually know what data was changed. Rather, the entire cluster will be recopied from source DSD 212 to target DSD 218. This would be analogous to having a first box of articles, receive a notification that a change to one of the articles has occurred, and then instead of attempting to replace the articles, replacing the changed box with a box identical to the original. Files do not have to be copied as files. Rather, the various clusters of the various disks or LUNs on source DSD 212 are replicated.

At an optional step 330, the first set of checksums originally created at step 312 can be updated with the checksums generated at step 322C. This final list of checksums can then be benchmarked against a set of checksums derived from the data written to target DSD 218 to confirm that the data written to target DSD 218 is identical to the source data 216. If any checksums do not match, then the respective source clusters can be respectively rewritten to the target DSD 218.

Figure 4:
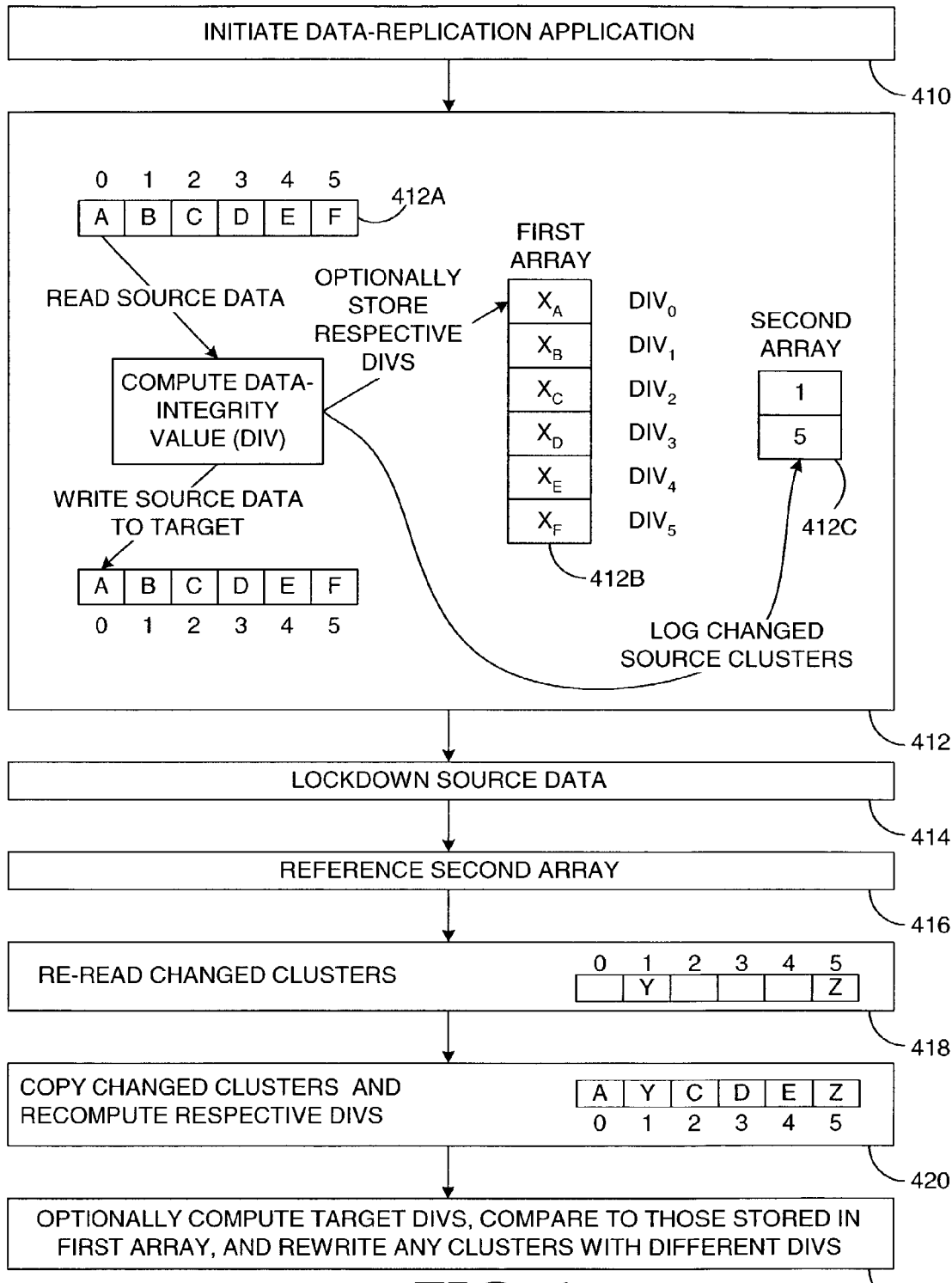
FIG. 4 represents an alternative, exemplary flow diagram of a process carried out by the present invention.

FIG. 4 represents an alternative embodiment of a method for practicing the present invention. At a step 410, data-replication application 228 is initiated. At a step 412, a series of events takes place that are illustrated in greater detail than in FIG. 3. As shown in FIG. 4, an exemplary set of source clusters 412A is provided. This data is read and respective DIVs are created for each data bin read. These DIVs can optionally be stored in a first array 412B as shown. The DIV for data bin A is $X_a$, stored in position DIV_0. Similarly, each other respective DIV is stored in the first array 412B and associated with its corresponding data bin. The data read from source DSD 212 is then written to a target device, such as target DSD 218.

During the writing process, application 228 can monitor source data stored in source DSD 212 and note whether data in any source clusters are modified. If data within a source data cluster is modified, those changed source clusters can be logged in a second array 412C. In a step 412, it can be seen that the data in clusters 1 and 5 were hypothetically modified and stored in second array 412C. The source data is locked down at a step 414. After having replicated a first copy of the data on source DSD 212, application 228 can reference second array 412C to determine which source clusters to re-replicate at a step 416. At a step 418, application 228 rereads the changed clusters listed in second array 412C, which here are 1 and 5. At a step 420 the changed clusters are copied and the respective DIVs can optionally be recomputed. In this example, a DIV for cluster 1 and for cluster 5 would be regenerated. The new DIVs, which reflect the changed source data, can be integrated into first array 412B.

Thus, at an optional step 422 the data written to target DSD 218 can be confirmed as identical to the data from source DSD 212. One exemplary method for carrying out this optional step is to compute DIVs for each cluster on target DSD and compare those with the DIVs stored in first array 412B. The DIVs computed and compared with those in first array 412B should be identical. If a disparity is found, then the respective source cluster can be recopied to the target cluster.

Figure 5:
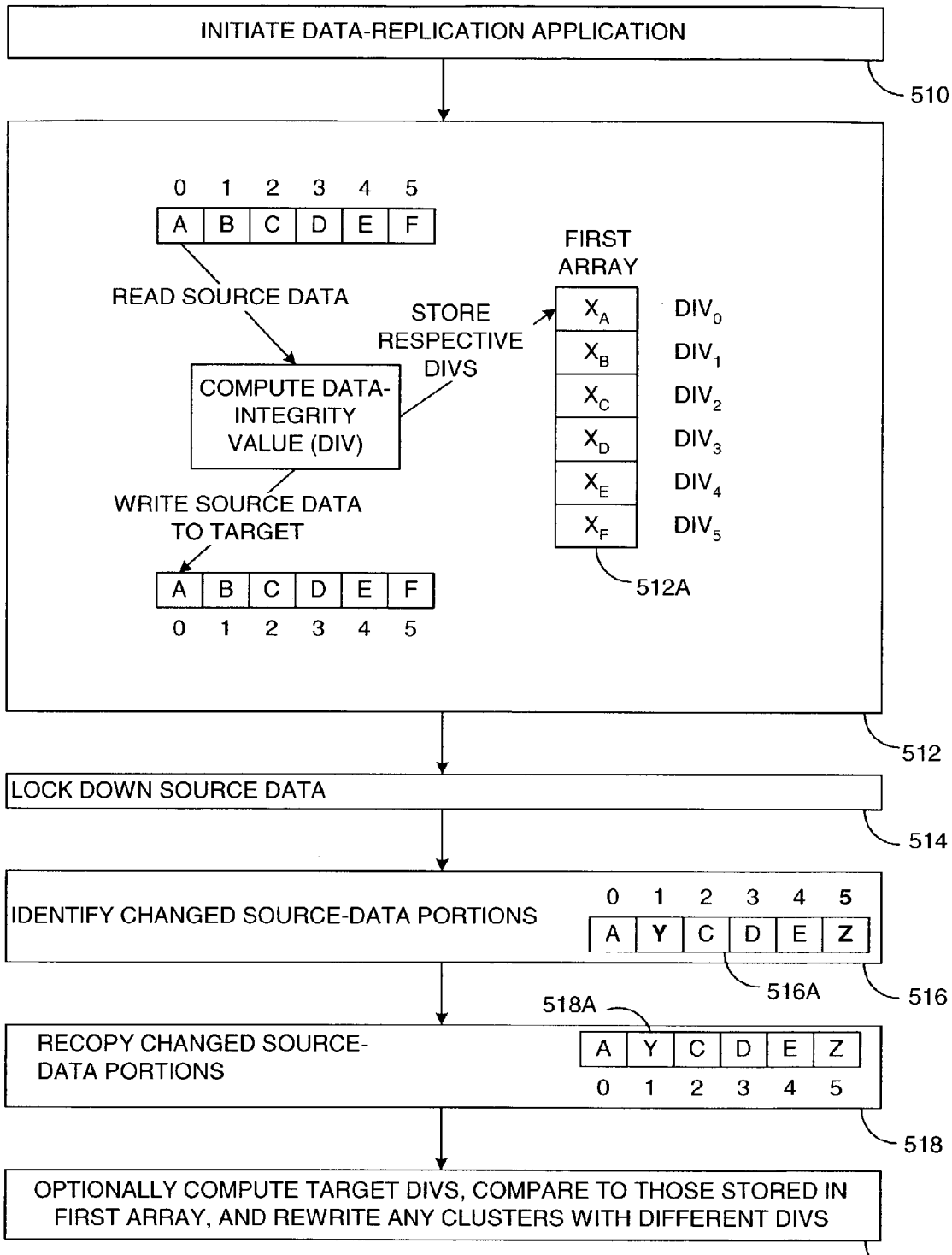
FIG. 5 represents a final exemplary flow diagram for carrying out the present invention.

In still another embodiment, FIG. 5 provides an alternative illustration of executing a method performed by the present invention. At a step 510, application 228 is initiated. At a step 512 a series of steps are accomplished, the details of which are discussed with reference to FIG. 5. Source data is read from the clusters of source DSD 212. Data-integrity values are generated for each cluster, or other data bin, read and stored in an array 512A. The data read from source DSD 212 is then written to target DSD 218. In this embodiment, source data from source DSD 212 is not monitored, but may be modified by applications running on servers 230, 232 and 234 during the writing process. However, at a step 514, after a first pass of copying data to target DSD 218, the source data on source DSD 212 is locked down.

At a step 516, application 228 can then identify which, if any, clusters on source DSD 212 changed during the writing process. Those skilled in the art will appreciate the myriad of ways of determining whether source data was modified during the writing process. An exemplary method for determining which clusters on source DSD 212 changed during the writing process would include rereading each source cluster, computing a second DIV, comparing this DIV with the respective DIV stored in array 512A and determining whether there was a difference. If the two DIVs did not match, then the source data must have changed during the writing process. The source data cluster can immediately be rewritten to target DSD 218, or included in an array for future reference. As shown, cluster representation 516A depicts that clusters 1 and 5 contain data that changed during the writing process. Thus, at a step 518 clusters 1 and 5 would be recopied from source DSD 212 to target DSD 218. As previously mentioned, it is not necessary to know that the data within clusters 1 and 5, for example "B" and "F," changed to "Y" and "Z" respectively. The present invention need only know that data within clusters 1 and 5 changed. The entire cluster is preferably recopied. If the source clusters were not individually and immediately copied, then the array storing the source cluster numbers could be referenced to rewrite the source clusters all at once to target DSD 218. At an optional step 520, the data on target DSD 218 can be confirmed as identical to data on source DSD 212 as of lockdown. An exemplary method for confirming that the two data sets are identical would be to compute individual checksums for each cluster of data on target DSD 218 and compare those checksums with the values stored in first array 512A. For each source data cluster that does not match the corresponding target data cluster, that source cluster can be recopied to target DSD 218.

Those skilled in the art will appreciate alternative means of implementing the described methods and processes for copying data from a source location to a target location without having to shut down applications that may modify that data during the entirety of a copying process. Those skilled in the art of computer programming appreciate that programs can be written in a variety of languages and a variety of means and in a variety of ways. The aforementioned disclosure should not be interpreted as limited to the specific order of the steps in the various process-flow diagrams.

As can be seen, the present invention and its equivalents are well-adapted to provide a new and useful method for retrieving information from network components. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for migrating data from a source data-storage device (DSD) to a target DSD, the method comprising:
   for each cluster of data stored on said source DSD:
   (1) reading said cluster of data from said source DSD;
   (2) computing a source data-integrity value (DIV) associated with said cluster of data read from said source DSD;
   (3) storing said computed source DIV;
   (4) writing said cluster of data to a target cluster on said target data-storage device;
   for each of at least a portion of the clusters of data written to said target DSD, identifying one or more changed source clusters, wherein said one or more changed source clusters are those source clusters that are not identical to their corresponding written clusters; and
   repeating the above steps at least once for at least one of said one or more changed source clusters.

2. The method of claim 1, where identifying said one or more changed source clusters comprise:
   computing a second source DIV associated with any of said one or more changed source clusters;
   comparing said second source DIV to the respective stored DIV; and
   if said second source DIV does not equal said respective stored DIV, then copying said changed source cluster to the respective target cluster.

3. The method of claim 2, wherein said source DIV is a cyclical-redundancy-check parameter.

4. The method of claim 3, wherein said target DIV is a cyclical-redundancy-check parameter.

5. One or more computer-storage media comprising instructions embodied thereon for executing the method of claim 1.

6. A system for transitioning data from a source data-storage device (DSD) to a target DSD comprising a data-migration component coupled to said source DSD and to said target DSD programmed to:
   read portions of data at a physical layer from said source DSD;
   write said portions of data to said target DSD;
   store a data-integrity value (DIV) associated with each of said data portions;
   while said portion of data is written to said target DSD, monitor whether any of said data initially read from said source DSD changes prior to writing all of said read portions of data; and
   after said portions of data are written to said target DSD, copy said changed source data portions from said source DSD to said target DSD.

7. The system of claim 6, wherein the data-integrity value (DIV) is a checksum.

8. The system of claim 7, wherein the checksum is a cyclical-redundancy-check value.

9. A method for upgrading data storage in a network computing environment comprising a plurality of servers coupled to a first data-storage device (DSD), the method comprising:
   coupling a data-migration component to said first DSD;
   coupling a second DSD to said data-migration component;
   exposing the data stored on said first data-storage device to data-migration component;
   copying data from said first DSD to said second DSD while said data is permitted to be updated on said first DSD; and
   while preventing changes to be made to the data stored in said first DSD, identifying which of the data from said first DSD was modified while the data from said first DSD was being copied to said second DSD; and
   while preventing updating any of said data on the first DSD, copying changed data from said first DSD to said second DSD, wherein said changed data is data on said first DSD that is not identical to its corresponding copied data on said second DSD.

10. The method of claim 9, wherein copying data includes copying data at a physical layer of said DSD.

11. The method of claim 10, wherein copying data at a physical layer includes iteratively copying portions of data stored on said first DSD.

12. The method of claim 11, wherein said portions of data include clusters of data.

13. The method of claim 11, wherein copying portions of data from said first DSD includes associating and storing a first data-integrity value (DIV) with each portion of data copied.

14. The method of claim 13, further comprising:
   prohibiting said source data from changing;
   identifying any source data portions that changed during the copying process; and
   copying the changed source data portions to the target DSD.

15. The method of claim 13, wherein identifying the changed source portions comprises:
   computing a second DIV associated with the data portions on said source DSD; and
   comparing the second DIV with the stored respective first DIV.

16. The method of claim 13, wherein identifying the changed source portions comprises comparing the data portions written to the second DSD with the respective data portions of said first DSD.

17. One or more computer-storage media, having computer-useable instructions embodied thereon for migrating data from a source data-storage device (DSD) that is updated during the migrating process, comprising:
   instructions for copying a first plurality of data bins from said source DSD;
   instructions for replicating said first plurality of data bins on a target DSD;
   instructions for preventing changes to be made to any of the data stored in said first plurality of data bins;
   instructions for identifying which of said first plurality of data bins house data that was modified while said first plurality of data bins were being replicated on said target DSD; and
   instructions for rereplicating those data bins identified as housing changed data incident to the execution of said instructions for preventing changes.

18. The computer-storage media of claim 17, wherein said data bins include clusters of data, wherein said clusters of data comprises physical portions of said DSD.

19. One or more computer-storage media, having computer-useable instructions embodied thereon for performing a method of migrating data from a source data-storage device (DSD), said method comprising:
   copying a first plurality of data bins from said source DSD;
   storing a first plurality of data-integrity values associated with each of said first plurality of data bins;
   replicating said first plurality of data bins on a target DSD;
   while preventing changes to be made to any data stored in said first plurality of data bins, identifying which of said first plurality of data bins house data that was modified while said first plurality of data bins were being replicated on said target DSD; and
   while preventing changes to be made to any data stored in said first plurality of data bins, rereplicating those data bins identified as housing changed data.

20. The computer-storage media of claim 19, wherein identifying which of said first plurality of data bins house data that was modified comprises:
   computing a second plurality of DIVs associated with the post-initial-copy data bins of said source DSD; and
   comparing said respective second DIVs with said first DIVs.

21. The computer-storage media of claim 20, wherein said data bins include physical data-storage components.

22. The computer-storage media of claim 20, wherein said physical data-storage components include disk clusters.

* * * * *